(12) United States Patent
Klaphake et al.

(10) Patent No.: US 8,939,176 B2
(45) Date of Patent: Jan. 27, 2015

(54) PISTON BORES AND METHODS OF MANUFACTURING PISTON BORES FOR A SERIES PROGRESSIVE DIVIDER VALVE

(75) Inventors: Andrew J. Klaphake, Minneapolis, MN (US); Anthony J. Kuschel, Plymouth, MN (US); Dain D. Thul, Coon Rapids, MN (US); Andrew J. Johnson, Brooklyn Park, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 65 days.

(21) Appl. No.: 13/700,288

(22) PCT Filed: May 27, 2011

(86) PCT No.: PCT/US2011/000961
§ 371 (c)(1),
(2), (4) Date: Nov. 27, 2012

(87) PCT Pub. No.: WO2011/149551
PCT Pub. Date: Dec. 1, 2011

(65) Prior Publication Data
US 2013/0118603 A1    May 16, 2013

Related U.S. Application Data

(60) Provisional application No. 61/348,851, filed on May 27, 2010, provisional application No. 61/348,854, filed on May 27, 2010, provisional application No. 61/349,022, filed on May 27, 2010, provisional application No. 61/349,040, filed on May 27, 2010, provisional application No. 61/349,052, filed on May 27, 2010.

(51) Int. Cl.
*F16K 1/00*      (2006.01)
*F15B 13/00*     (2006.01)
(Continued)

(52) U.S. Cl.
CPC ......... *F16K 11/0716* (2013.01); *F15B 13/0842* (2013.01); *F16K 11/02* (2013.01); *F16K 11/10* (2013.01); *B23P 15/001* (2013.01); *F16K 31/363* (2013.01)
USPC .............................. 137/884; 184/7.4; 222/249

(58) Field of Classification Search
USPC .............. 137/119.03, 884; 184/7.4, 6, 29, 32, 184/39.1; 222/249–250
See application file for complete search history.

(56) References Cited

U.S. PATENT DOCUMENTS 2,792,911 A    5/1957   Harter
2,973,058 A    2/1961   Bricout
(Continued)

OTHER PUBLICATIONS

International Search Report for PCT Application Serial No. PCT/US2011/00961, mailed Jan. 11, 2012, 8 pages.

*Primary Examiner* — John Fox
*Assistant Examiner* — Michael R Reid
(74) *Attorney, Agent, or Firm* — Kinney & Lange, P.A.

(57) ABSTRACT

A series progressive divider valve comprises a valve body and pistons. The valve body comprises a fluid inlet, piston bores, outlet bores and porting. The fluid inlet extends into an exterior of the valve body. The piston bores extend through the valve body from a first end to a second end, wherein the piston bores are arranged along a first circular path intersecting each of the piston bores. Each piston bore includes a piston. The outlet bores extend into the valve body, and each outlet bore comprises a first set of outlet bores, and a second set of outlet bores. The porting forms a plurality passageways connecting the piston bores to each other and with the outlet bores such that when high pressure fluid is applied to the inlet each of the pistons reciprocates from the first end to the second end in sequence.

18 Claims, 11 Drawing Sheets

(51) Int. Cl.
*F16N 27/00* (2006.01)
*G01F 11/04* (2006.01)
*F16K 11/07* (2006.01)
*F15B 13/08* (2006.01)
*F16K 11/02* (2006.01)
*F16K 11/10* (2006.01)
*B23P 15/00* (2006.01)
*F16K 31/363* (2006.01)

(56) References Cited

U.S. PATENT DOCUMENTS

| | | | |
|---|---|---|---|
| 3,298,460 A | 1/1967 | Porter et al. | |
| 3,422,926 A | 1/1969 | Stanaway | |
| 3,438,463 A | 4/1969 | Gruber | |
| 3,467,222 A | 9/1969 | Gruber | |
| 3,590,956 A | 7/1971 | Obergefell | |
| 3,666,048 A | 5/1972 | Zajaczkowski | |
| 3,866,625 A * | 2/1975 | Kemner et al. | 137/269 |
| 4,044,924 A | 8/1977 | Saretzky | |
| 4,105,094 A * | 8/1978 | Callahan | 184/7.4 |
| 4,186,821 A | 2/1980 | Wegmann | |
| 4,312,425 A | 1/1982 | Snow et al. | |
| 4,609,073 A | 9/1986 | Knaebel | |
| 4,921,072 A | 5/1990 | Divisi | |
| 5,480,004 A | 1/1996 | Snow | |
| 5,628,384 A | 5/1997 | Mismas | |
| 5,730,174 A | 3/1998 | Mismas | |
| 5,810,115 A | 9/1998 | Mismas | |
| 6,371,150 B1 | 4/2002 | Shimada | |
| 7,096,889 B1 | 8/2006 | Roys | |
| 2007/0029140 A1 | 2/2007 | Smigelski | |

* cited by examiner

FIG. 2  _Prior Art_

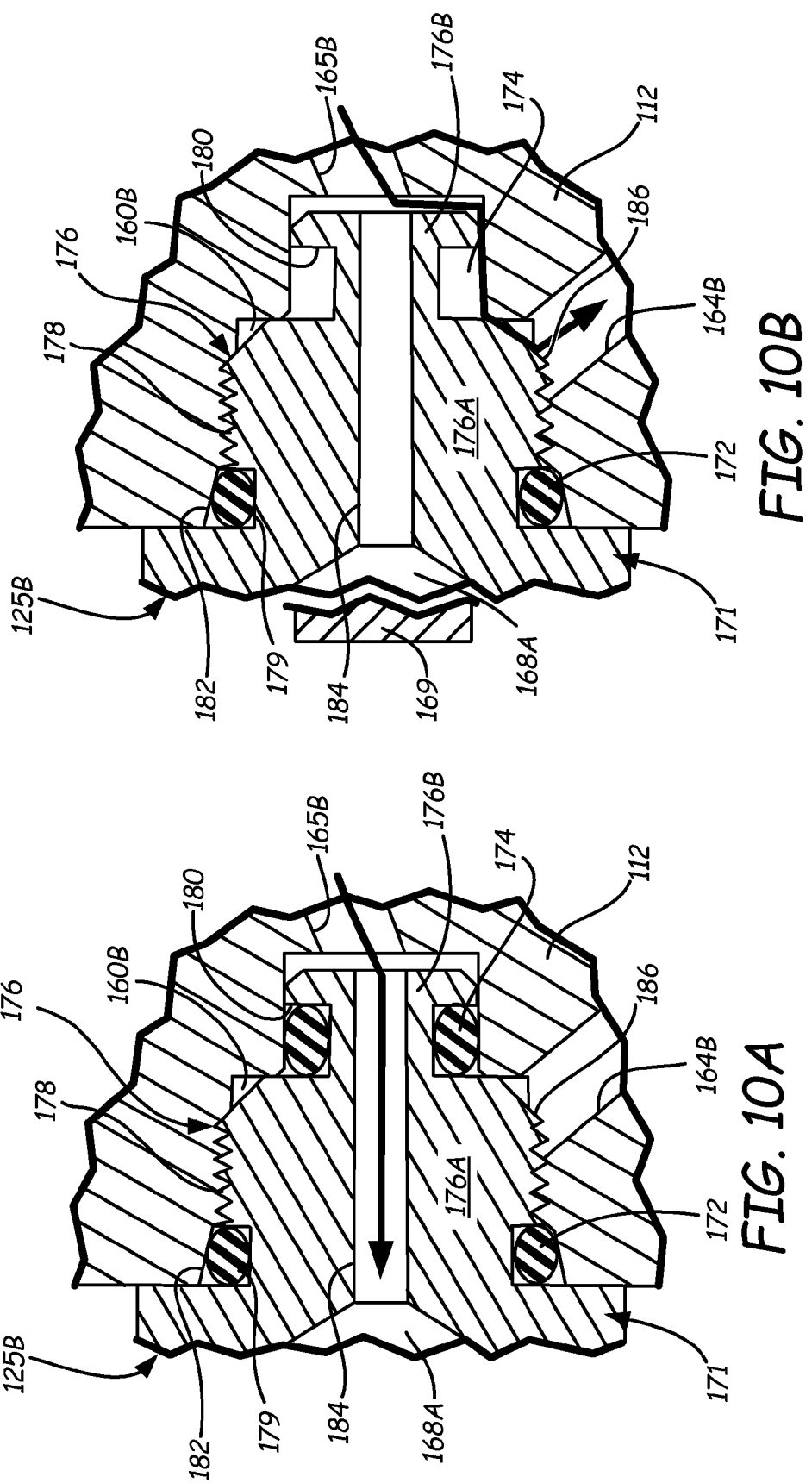

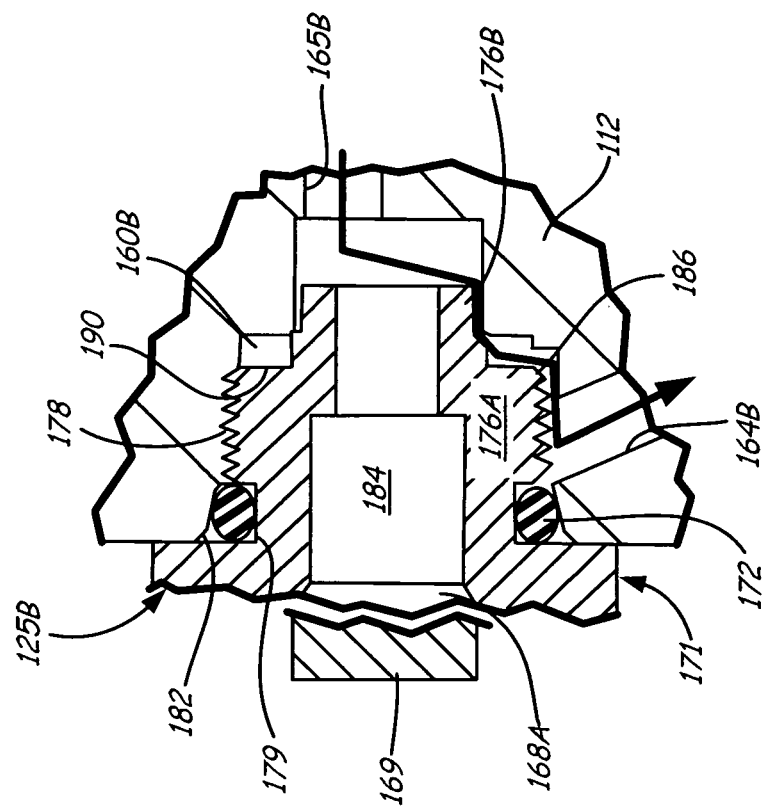
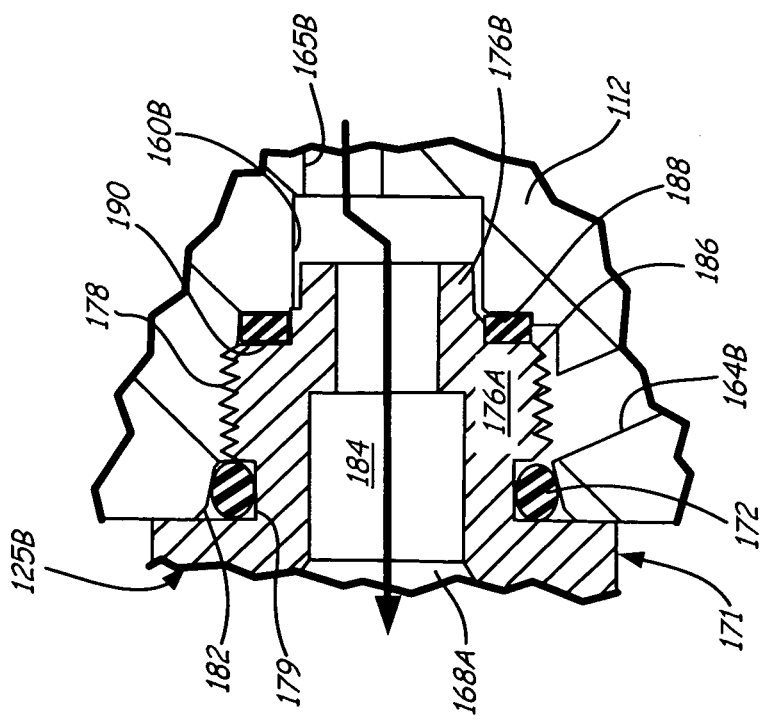

PISTON BORES AND METHODS OF MANUFACTURING PISTON BORES FOR A SERIES PROGRESSIVE DIVIDER VALVE

BACKGROUND

The present invention relates generally to series progressive divider valves. More particularly, the present invention relates to fittings for plugging outlet ports such that fluid can be directed to the next outlet port in the series progression.

Series progressive divider valves have long-existed in the art and comprise a mechanism for dividing a single, steady input of pressurized fluid into multiple, distributed bursts of fluid. Thus, fluid is delivered to the valve body at a single inlet port and delivered to multiple discrete outlet ports through cyclic operation of an array of pistons or spools under pressure from the fluid. The valve output cycles continuously through the outlet ports in a scheduled progression based on movement of the array of pistons. For example, conventional series progressive divider valves include an array of pistons in which the central axes of all the pistons are arranged in a single plane. Outlets for each end of the piston are typically arranged in a plane parallel to the plane of the pistons. The outlets are connected to the pistons through an elaborate system of portings machined into the valve body.

The pistons reciprocate within bores of the valve body enclosed by end caps. The pistons themselves include a pair of axially spaced undercuts such that each piston forms three lobes. As such, when a piston is inserted into a bore and enclosed by end caps, four pressure chambers are formed: one end chamber at each end of the piston and two internal chambers within the piston. Each end chamber is connected to an internal chamber of the next piston in the progression through porting extending through the valve body. Additionally, each internal chamber is connected to an outlet of the valve through the use of separate porting. Thus, a four piston valve includes eight outlets. High pressure inlet porting connects each piston bore and, depending on the position of each piston, one of the internal chambers for each piston. All connections and outlets are made on the same side of the valve body and at the same ends of the pistons, except, however, end chambers of a "first" piston are connected to internal chambers of a "last" piston such that the pistons can reverse direction and the series progression can continue ad infinitum.

Operation of a typical series progressive divider valve is explained with reference to drawings from the prior art, specifically U.S. Pat. No. 4,312,425 to Snow et al., which shows a simplified piston and outlet configuration. FIG. 1 shows a perspective view of a typical series progressive divider valve having valve body 10 formed from a plurality of block bodies 10A-10H. FIG. 2 shows a schematic of valve body 10 including pistons 12A, 12B and 12C. FIG. 1 and FIG. 2 are discussed concurrently. As shown, each of pistons 12A-12C includes three lobes, designated as 14A, 14B, 14C, 16A, 16B, 16C, 18A, 18B and 18C, respectively. Lobes 14A-18C produce undercuts 20A, 20B, 20C, 22A, 22B and 22C, respectively. Pistons 12A, 12B and 12C reciprocate in bores 24A, 24B and 24C, respectively, which form end chambers 26A, 26B, 26C, 28A, 28B and 28C, respectively. Additionally, undercuts 20A-22C form internal chambers 30A, 30B, 30C, 32A, 32B and 32C. Each of undercuts 20A-22C, and the chamber formed thereby, is fluidly connected to one of valve outlets 38A-38F and another undercut via porting machined into valve body 10. Specifically, internal pumping chamber 30A is fluidly connected to end chamber 28C via porting 36A and to outlet 38A via porting 40A. Internal pumping chamber 30B is fluidly connected to end chamber 26A via porting 36B and to outlet 38B via porting 40B. Internal pumping chamber 30C is fluidly connected to end chamber 26B via porting 36C and to outlet 38C via porting 40C. Internal pumping chamber 32A is fluidly connected to end chamber 26C via porting 36D and to outlet 38D via porting 40D. Internal pumping chamber 32B is fluidly connected to end chamber 28A via porting 36E and to outlet 38E via porting 40E. Internal pumping chamber 32C is fluidly connected to end chamber 28B via porting 36F and to outlet 38F via porting 40F.

High pressure porting 42 distributes high pressure fluid from inlet 44 to bores 24A-24C. High pressure porting 42 fluidly connects inlet 44 to internal chambers 30A-32C, depending on the position of lobes 16A-16C. High pressure fluid is always provided directly to one side of each of lobes 16A-16C depending on the position of each of pistons 12A-12C. As shown, high pressure fluid is provided to internal chambers 32A, 30B and 30C. As such, high pressure fluid is also provided to end chambers 26C, 26A and 26B, via porting 36D, 36B, 36C, respectively. In the last piston movement before the configuration shown in FIG. 2, low pressure fluid has been dispensed from port 38F via movement of piston 12B downward through porting 36F and 40F. Subsequently, as shown in FIG. 2, high pressure fluid is provided to chambers 26B and 26C. High pressure fluid in chambers 26B and 26C does not produce movement of pistons 12B and 12C because lobes 18B and 18C are already engaged with the end caps of bores 24B and 24C. High pressure fluid in chamber 26A will, however, produce downward movement of piston 12A as end chamber 28A discharges low pressure fluid. Low pressure fluid in end chamber 28A, through porting 36E, displaces fluid in internal chamber 32B out of outlet 38E through porting 40E.

Such displacement of pistons 12A-12C is repeated so long as high pressure fluid is provided to inlet 44, with porting 36D and 36A connecting internal chambers and end chambers on opposite ends of the pistons to permit reversing of the axial piston positions. For example, piston 12C moves downward pushing fluid through outlet 38A, piston 12B then moves downward pushing fluid through outlet 38F, piston 12A then moves downward pushing fluid through outlet 38E, then piston 12C moves upward pushing fluid through outlet 38D, then piston 12B moves upward pushing fluid through outlet 38C and finally piston 12A moves upward pushing fluid through outlet 38B.

As mentioned, in order to achieve such cyclic movement, valve body 10 is provided with an elaborate system of three dimensional porting. Such porting is produced using a series of machining operations, particularly drilling, in a plurality of rectangular blocks. For example, valve body 10 is produced from blocks 10A-10H as shown in FIG. 1. Blocks 10A and 10E comprise "inlet" and "end" blocks with porting necessary to route fluid between pistons at the end of the array. Intermediate blocks 10B-10D are identical to each other and include piston bores 24A-24C. Intermediate blocks 10F-10H are identical to each other and include outlets 38A-38F. Intermediate blocks 10B-10D are paired with intermediate blocks 10F-10H to form a piston and outlet combination. In order to change the number of pistons and outlet ports one pair of intermediate blocks can be removed. However, such an operation requires tedious and time consuming disassembly and reassembly of the blocks, such as by removal and replacement of screws 46A-46I. Such assembly intricacies are further detailed are described in the aforementioned U.S. Pat. No. 4,312,425 to Snow et al.

The use of a plurality of separate intermediate blocks reduces or eliminates the need for unnecessary "open ended" drilling operations. These drilling operations are intended to connect other passages, but are not intended to produce a passage that opens to the exterior of the valve body. However, due to manufacturing limitations the drilling operations are necessary and the open end must be plugged. For example, two parallel ports may need to be connected by drilling a perpendicular port. The perpendicular port does not, however, need to be opened to the exterior of the valve block. Such ports have typically been closed off using steel balls welded in place, as is described in U.S. Pat. No. 3,467,222 to Gruber. These methods thus require additional manufacturing steps and additionally introduce potential leak points and stress points into the system.

In other configurations of prior art series progressive valves, outlet ports 38A-38F can be connected to each other through cross-porting and plugging. In particular, outlet 36C can be ported to connect with outlets 38A and 38B. Likewise, outlet 38F can be ported to connect with outlets 38E and 38D. When configured as such, outlet 38B can be plugged to direct what would be its discharge into outlet 38C so that outlet 38C will receive a double shot of fluid. Additionally, outlet 38C can be plugged so outlet 38A can be configured to receive a triple shot of fluid. However, in conventional series progressive valves using intermediate blocks, outlet 38A cannot be plugged because no porting is provided between outlets 38A and 38B due to the complexity of the required porting that cannot be introduced into the modular block design of blocks 10A-10H. In other words, the required porting would result in each intermediate block having a unique configuration. As such, outlet 38A becomes a "last stop" outlet that must be permitted to allow fluid from valve body 10 because there is not another outlet to which fluid can be routed. As such if outlets 38A, 38B and 38C were plugged, operation of valve body 10 would seize up. Outlet 38D also becomes a "last stop" outlet for the same reason.

Cross-porting requires blocking of outlet ports with fittings or plugs from which it is desired to prevent fluid flow. Such cross-port fittings are shown in the Quicklub® Progressive Divider Valves brochure for SSV & SSVM Series valves commercially available from Lincoln Industrial, an SKF company. These fittings, however, require the use of several different plug and ferrule combinations. Other methods of output combining involve force fitting brass plugs into the outlets. These plugs, however, wear after repeated use and become ineffective.

SUMMARY

A series progressive divider valve comprises a valve body and pistons. The valve body comprises a fluid inlet, piston bores, outlet bores and porting. The fluid inlet extends into an exterior of the valve body. The piston bores extend through the valve body from a first end to a second end, wherein the piston bores are arranged along a first circular path intersecting each of the piston bores. Each piston bore includes a piston. The outlet bores extend into the valve body, and each outlet bore comprises a first set of outlet bores, and a second set of outlet bores. The porting forms a plurality passageways connecting the piston bores to each other and with the outlet bores such that when high pressure fluid is applied to the inlet each of the pistons reciprocates from the first end to the second end in sequence.

BRIEF DESCRIPTION OF THE DRAWINGS

FIG. 10A is cross-sectional view of a first embodiment of a double-sealed cross-port fitting in a pass-through configuration.

FIG. 10B is a cross-sectional view of the double-sealed cross-port fitting of FIG. 10A in a bypass configuration.

FIG. 11A is cross-sectional view of a second embodiment of a double-sealed cross-port fitting in a pass-through configuration.

FIG. 11B is a cross-sectional view of the double-sealed cross-port fitting of FIG. 11A in a bypass configuration.

DETAILED DESCRIPTION

Figure 3:
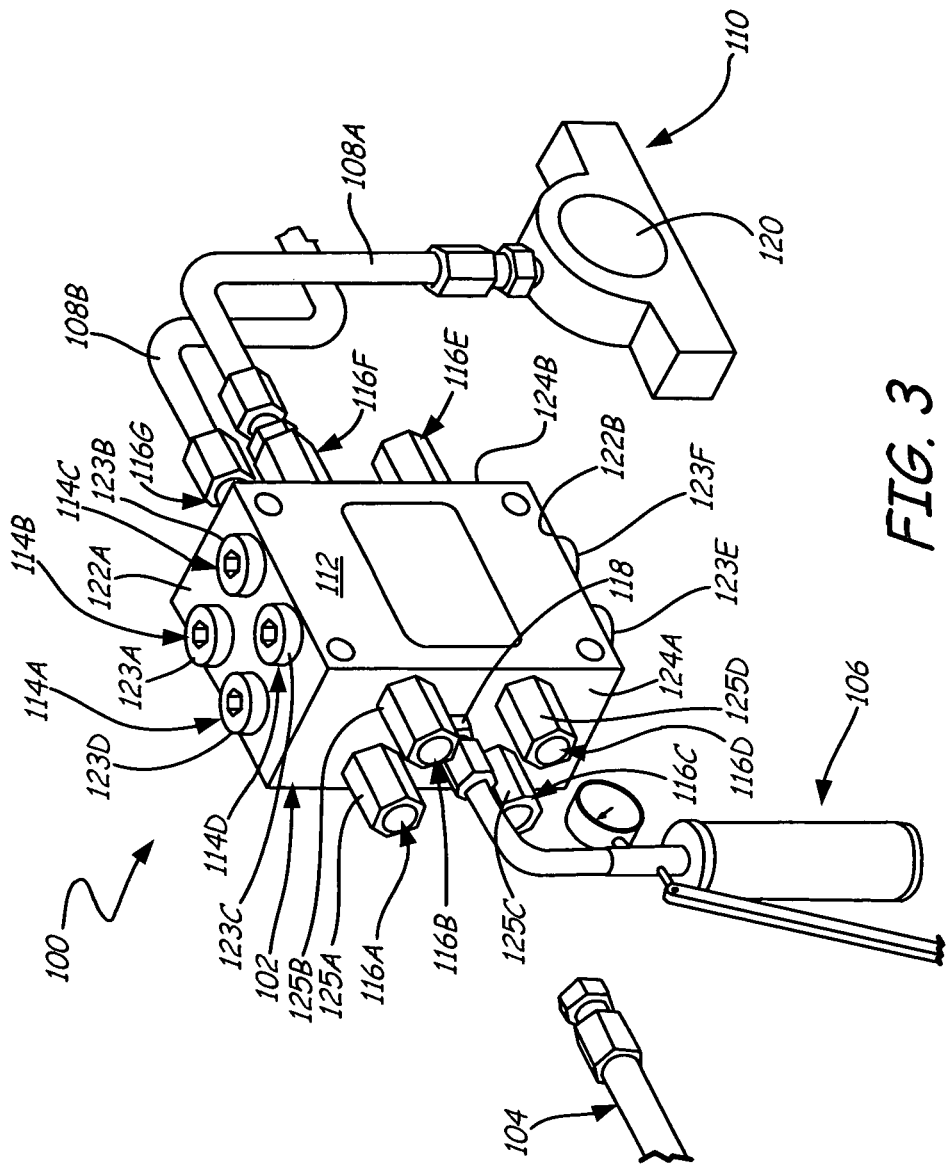
FIG. 3 is a perspective view of a lubrication system using a series progressive divider valve of the present invention having a unibody valve block with four pistons and eight outlets.

FIG. 3 is a perspective view of lubrication system 100 using unibody series progressive divider valve 102 of the present invention having four pistons and eight outlets. Lubrication system 100 also includes automated fluid source 104, manual fluid source 106, hoses 108A and 108B, and lubricant destination 110. Valve 102 includes unibody valve block 112, piston stations 114A-114D, outlets 116A-116G and inlet 118. Manual fluid source 106 is connected to inlet 118 using any appropriate fitting. For example, inlet 118 may comprise a Zerk fitting and manual fluid source 106 may comprise a grease gun. Alternatively, valve 102 may be connected to automated fluid source 104, such as a large output pump, that provides a greater volume of fluid at a higher pressure.

Valve 102 includes a plurality of pistons disposed within stations 114A-114D that provide output to outlets 116A-116G. Outlets 116A-116G can be coupled to hoses to provide fluid to a plurality of destinations. As shown, hose 108A connects to fluid destination 110, which comprises bearing 120. For example, bearing 120 may comprise a wheel bearing in a vehicle or a shaft bearing in a machine. Hose 108B can be coupled to another bearing on another wheel or to some other component of the machine requiring fluid.

Valve 102 receives a single input from inlet 118 and divides the input into multiple outputs. Valve 102 also includes a second inlet (not shown) located on the opposite side of valve 102 that can be used as an alternative to inlet 118. Although only seven outlets 116A-116G are shown, each piston station 114A-114D provides output to two outlets, one toward each end of the piston. Pressure provided by manual fluid source 106 or automated fluid source 104 activates the pistons within valve 102 to cycle through delivering individual bursts of output at each of outlet 116A-116G. The pistons continue to cycle output bursts to successive outlets so long as pressurized fluid is provided to inlet 118. Valve 102 is therefore typically useful in situations where multiple destinations require intermittent small amounts of lubrication rather than steady large amounts of lubrication, such as semi-trailers, construction equipment, wind turbines and complex machinery.

Valve 102 is comprised of a single block of material, typically steel or some other metal, forming valve block 112. Valve 102 comprises a parallelepiped body having six surfaces in the described embodiments, but may comprise other shapes. In the present invention, piston stations 114A-114D are configured perpendicular to outlets 116A-116G. For example, valve 102 includes piston faces 122A and 122B through which drilled bores extend to receive the pistons. The drilled bores are plugged with end caps, such as caps 123A-123F, to retain the pistons and form piston stations 114A-114D. Outlets 116A-116G are provided by bores extending into outlet faces 124A and 124B. Outlets 116A-116G include fittings that can be configured to couple to hoses or configured to route output to another outlet. For example outlets 116A-116D include fittings 125A-125D.

Figure 4:
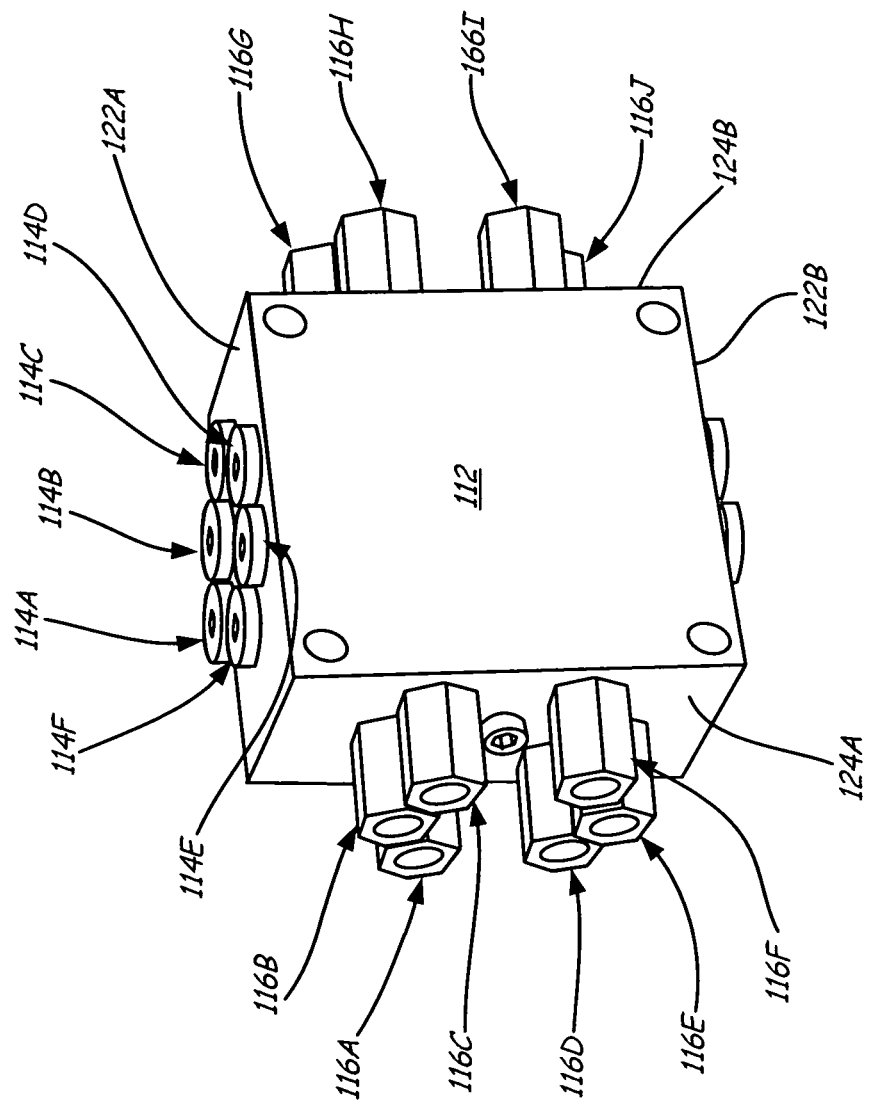
FIG. 4 is a perspective view of a second embodiment of a series progressive divider valve of the present invention having a unibody valve block with six pistons and twelve outlets.
Figure 5:
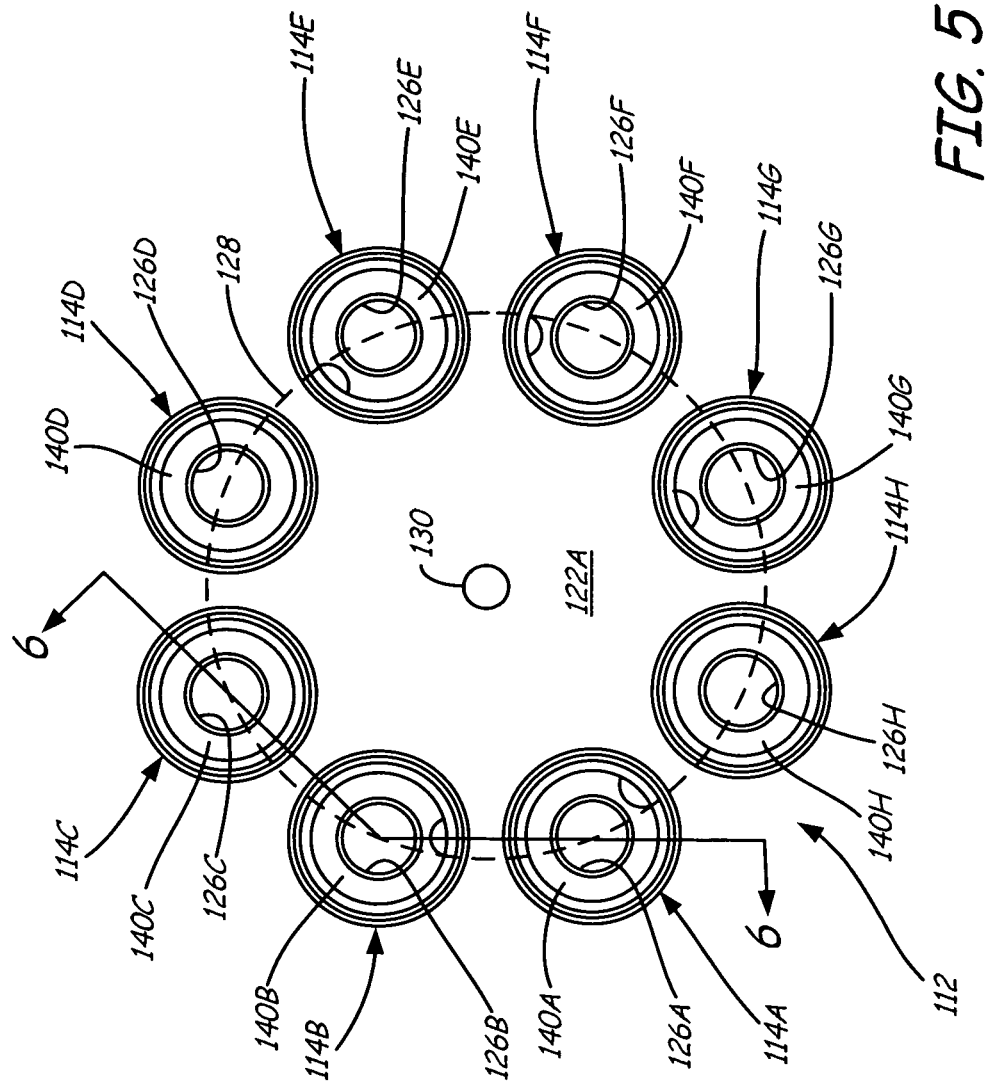
FIG. 5 is a top view of a third embodiment of a series progressive divider valve of the present invention having a unibody valve block with a circular arrangement of an eight piston array.
Figure 6:
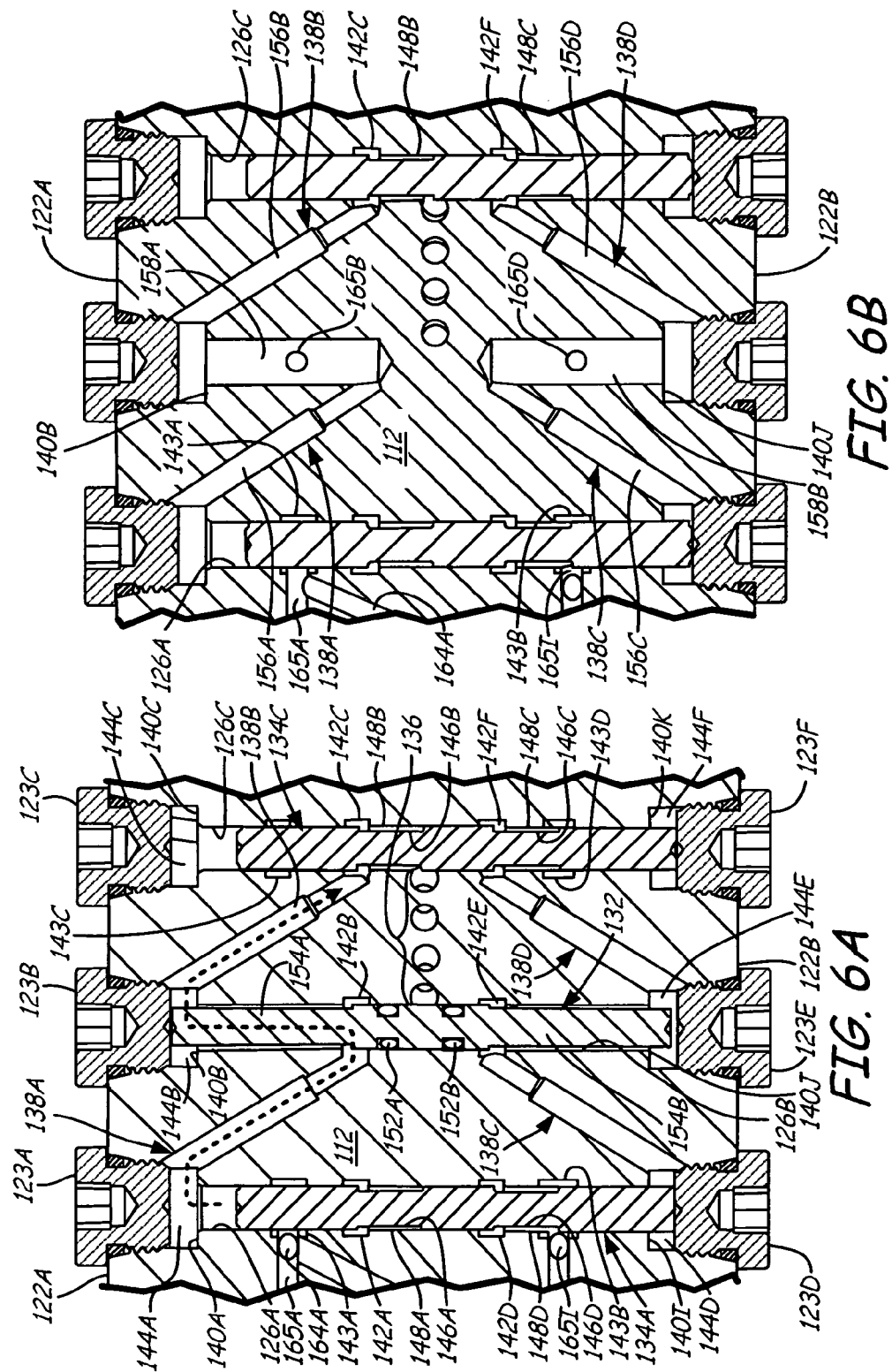
FIG. 6A is a diagrammatic cross-section through a first embodiment of the valve block of FIG. 5 taken at section 6-6 showing a bypass piston inserted in a piston bore.
FIG. 6B is a diagrammatic cross-section through a second embodiment of the valve block of FIG. 5 taken at section 6-6 showing a dummy piston bore.
Figure 7:
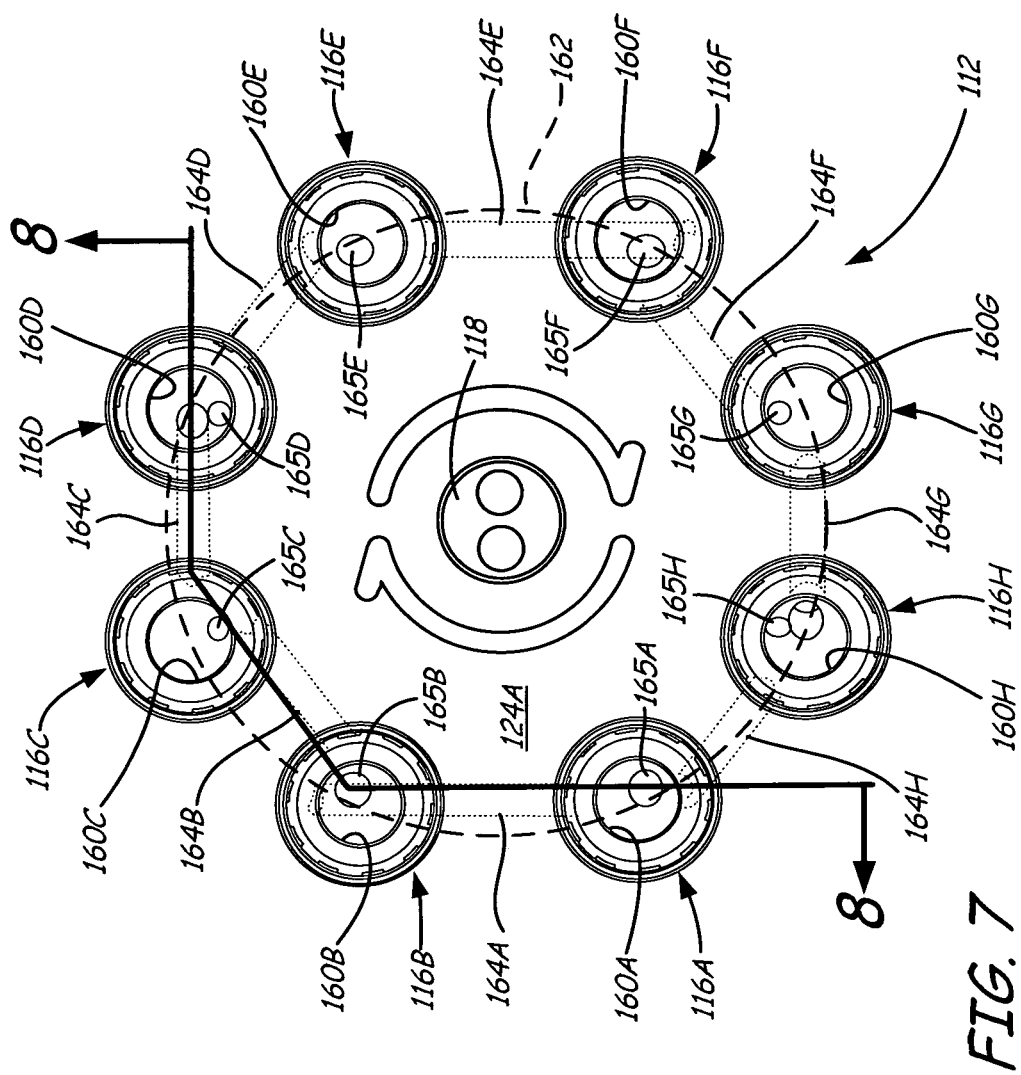
FIG. 7 is a side view of the third embodiment of the series progressive divider valve of the present invention having a unibody valve block with a circular arrangement of an eight outlet array.
Figure 8:
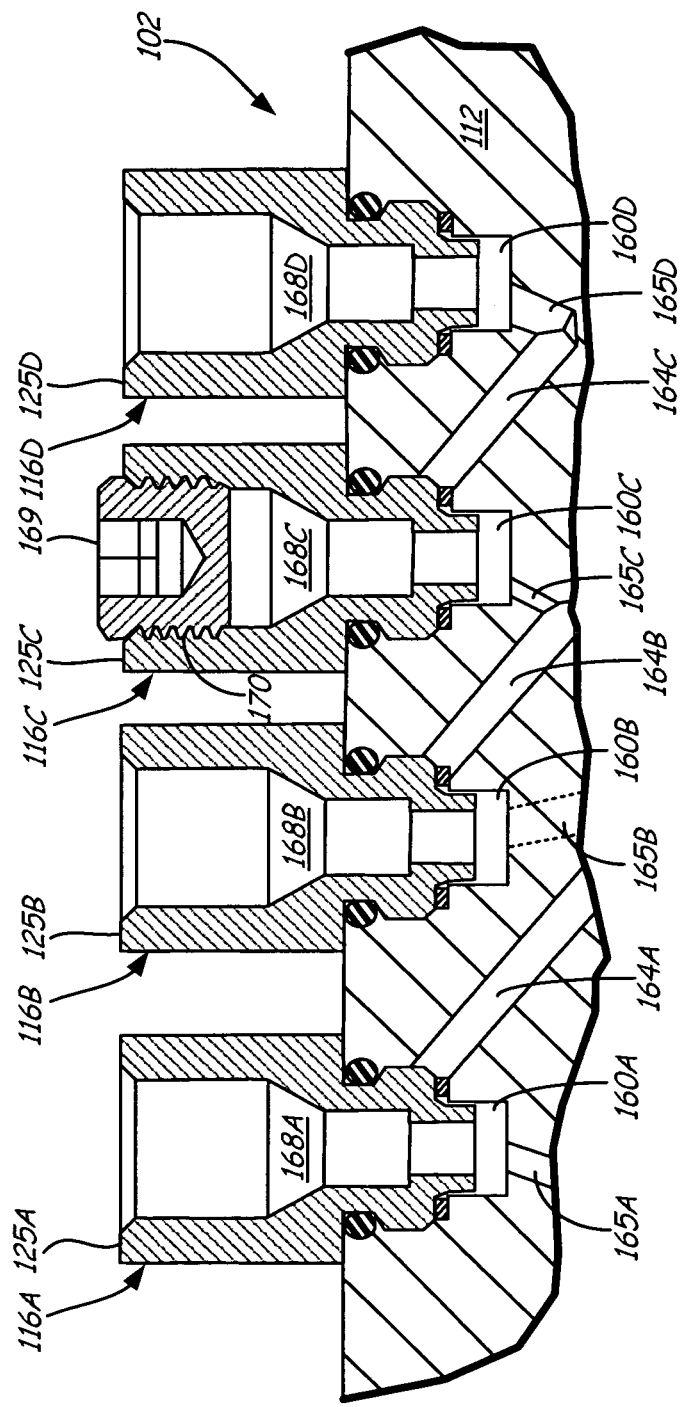
FIG. 8 is a diagrammatic cross-section through the series progressive divider valve of FIG. 7 taken at section 8-8 showing bypass passages connecting valve outlets.

Valve block 112 can be configured with different numbers of piston stations and different numbers of active piston stations, which differs the number of outlets and active outlets. As shown in FIG. 3, valve block 112 is ported for four pistons and eight outlets. As shown in FIG. 4, valve block 112 is ported for six pistons and twelve outlets. As shown in FIGS. 5 and 7, valve block 112 is ported for eight pistons and sixteen outlets. FIGS. 6A and 6B show how piston stations can be bypassed to reduce the number of active piston stations and outlets for a particular valve block configuration. FIGS. 5 and 7 further show how valve stations 114 and outlets 116 can be arranged in circular patterns to facilitate manufacturing and improve performance. FIG. 8 shows how circularly arranged outlets 116 can be plumbed together to enable cross-port fittings that reduce the number of active outlets. FIGS. 9-11B show various cross-port fittings that can be used in outlets 116.

In each configuration depicted in FIGS. 3-11B, each piston station 114 and outlet 116 is analogous, unless specified otherwise. The only changes from one embodiment to another being the number of pistons and the diameter of circles around which the piston stations and outlets are arranged. As used throughout the specification, analogous components, such as piston stations, pistons, outlets, end caps, etc., are identified using a common reference numeral. Each reference numeral is associated with a reference letter specific to each Figure such that the letter does not necessarily correspond to a letter from another Figure, unless specified otherwise. For example, FIG. 3 refers to piston stations 114A-114D, while FIG. 4 refers to piston stations 114A-114F. Piston station 114A of FIG. 3 is not piston station 114A of FIG. 4, but each is functionally equivalent.

Figure 1:
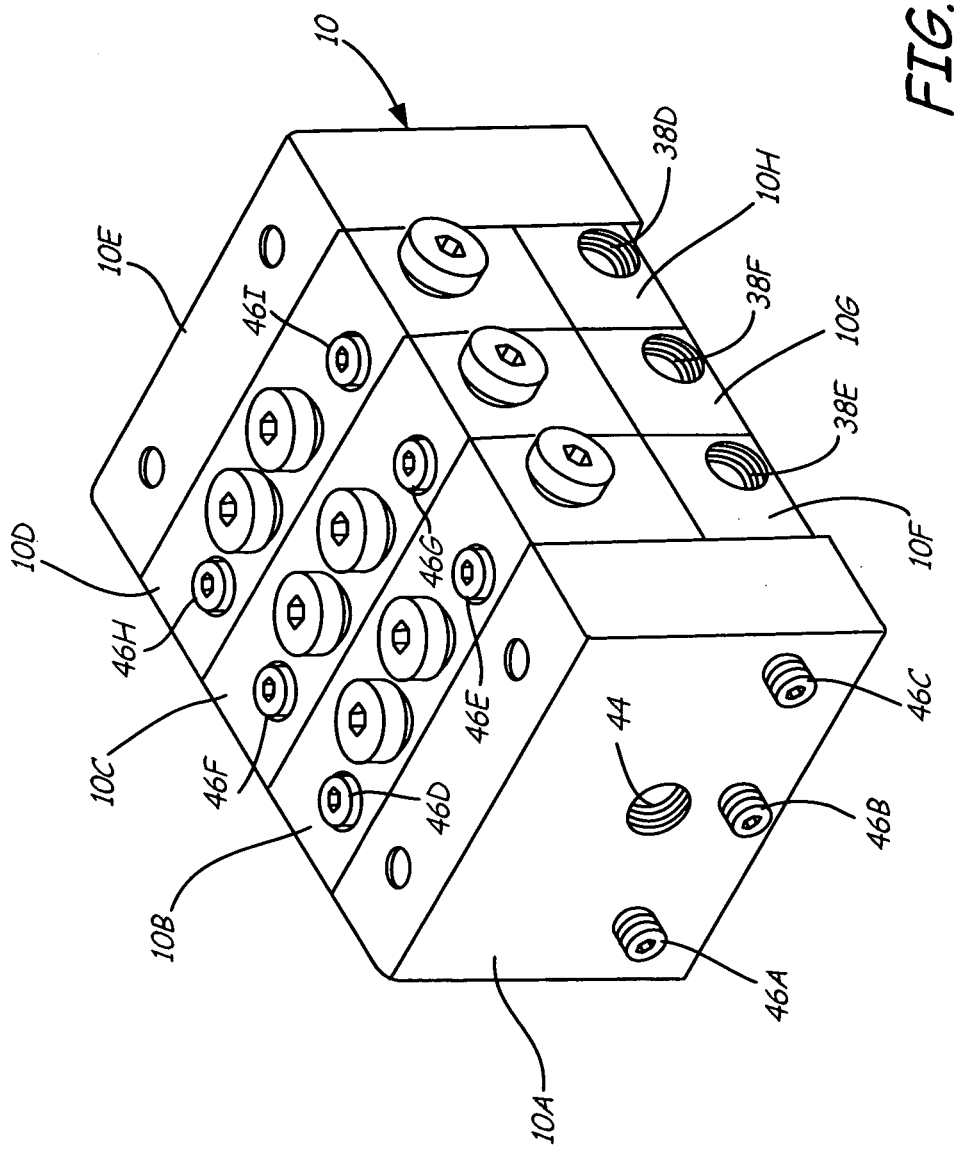
FIG. 1 is a perspective view of a prior art series progressive divider valve fabricated from several discrete valve body blocks.
Figure 2:
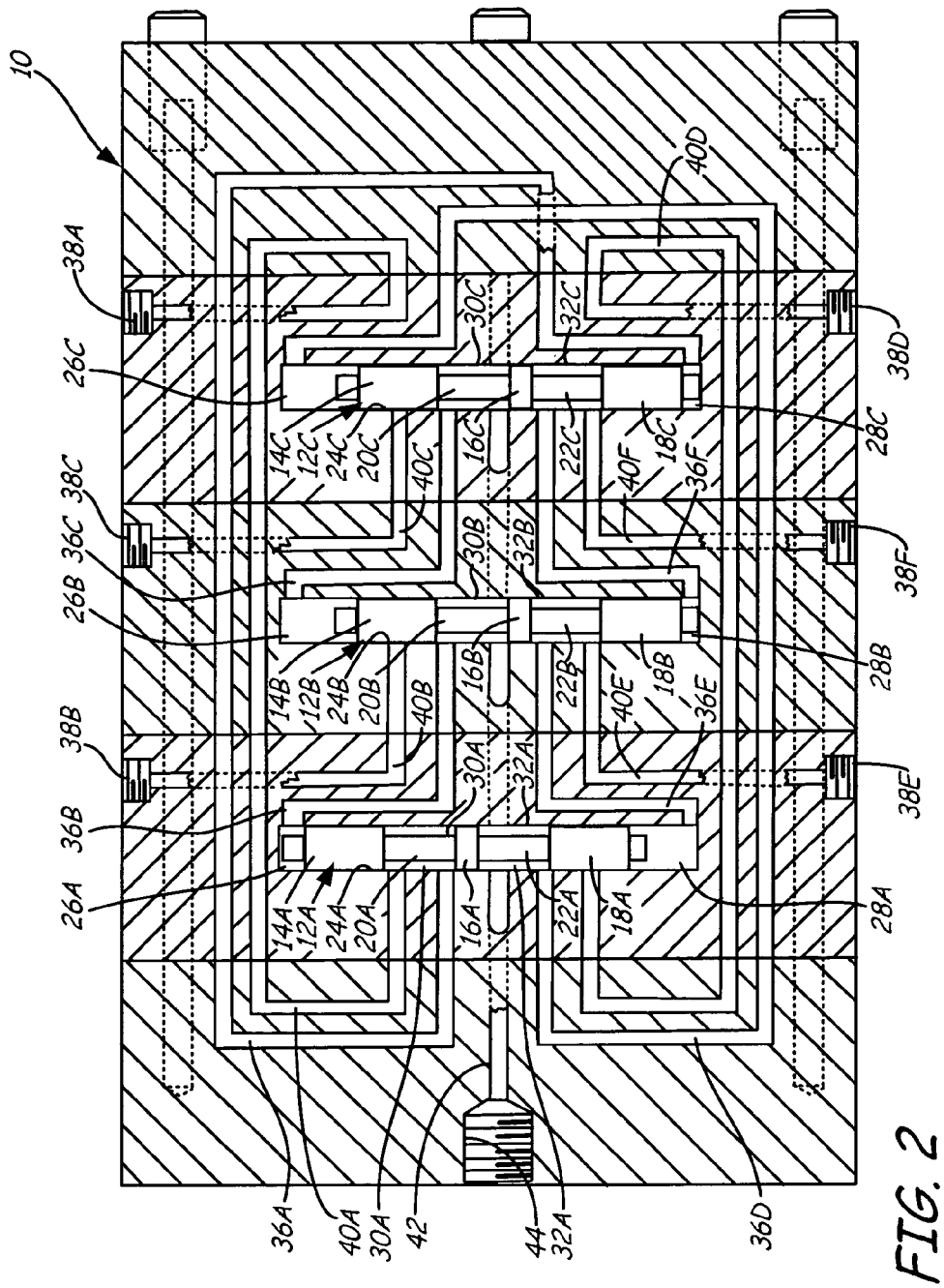
FIG. 2 is a diagrammatical view of a cross-section through the prior art series progressive divider valve of FIG. 1 showing piston bores interconnected with outlet bores via a network of porting extending through the several valve body blocks.

With respect to operation of the present invention, the various series progressive divider valves of FIG. 3-FIG. 11B perform in the same general manner as that which is described with reference to FIG. 2 from a schematic fluid flow standpoint. Series progressive divider valves of the present invention, however, include novel porting and bore arrangements not shown in FIG. 2 that connect the various piston chambers and outlets, which are produced from novel manufacturing processes and methods. FIG. 2 is presented for ease of explanation of the operation of series progressive divider valves in general. Thus, the present invention performs everything described in FIG. 2, but FIG. 2 does not describe everything in FIGS. 3-11B.

FIG. 4 is a perspective view of a second embodiment of unibody series progressive divider valve 102 of the present invention having six piston stations and twelve outlets, of which stations 114A-116F and outlets 116A-116J are shown. Each of piston stations 114A-114F is shown closed off by a cap, analogous to caps 123A-123F of FIG. 3. Similarly, each of outlets 116A-116J is shown connected to a fitting, analogous to fittings 125A-125D of FIG. 3. As mentioned above, valve block 112 is formed of a single piece of material into which stations 114 and outlets 116 are machined. Furthermore, all machining operation required to fluidly link piston stations 114 and outlets 116 can be performed through the bores machined for piston stations 114 and outlets 116. Such machining operations are enabled by placement of piston stations 114A-114F between piston faces 122A and 122B and placement of outlets 116A-116F between outlet faces 124A and 124B. Furthermore, the machining operations are enabled by arrangement of piston stations 114 in a circle-like pattern, as discussed with reference to FIG. 5. Additionally, arrangement of outlets 116 in a circle-like pattern allows each outlet on its respective outlet face 124A or 124B to be connected to both adjacent outlets on the outlet face, as discussed with reference to FIG. 7.

FIG. 5 is a top view of a third embodiment of unibody series progressive divider valve 102 of the present invention showing valve block 112 having eight piston stations 114A-114H arranged in a circular array. Each of piston stations 114A-114H comprises one of piston bores 126A-126H. Piston stations 114A-114H are arranged along circle 128 and around center point 130. FIG. 6A is a diagrammatic cross-section through a first embodiment of valve block 112 of FIG. 5 taken at section 6-6 showing piston bores 126A-126C and bypass piston 132 inserted into piston bore 126B and pistons 134A and 134C inserted into piston bores 126A and 126C, respectively. Piston bores 126A-126C are provided with end caps 123A-123F. FIGS. 5 and 6A are discussed concurrently.

In FIG. 5 piston stations 114A-114H are shown without end caps 123A-123F such that piston bores 126A-126H are visible. Piston bores 126A-126H extend into piston face 122A of valve block 112 through to piston face 122B, as shown in FIG. 6A. Piston bores 126A-126H are connected by a network of porting to permit fluid to pass from one bore to the next, as can partially be seen in FIG. 6A. For example, piston bores 126A-126C include porting 136 and 138A-138D. Piston bores 126A-126C also include other features to facilitate connection of end caps 126A-126F and porting 138A-138D. For example, piston bores 126A-126H include counter bores 140A-140H, undercuts 142A-142F and undercuts 143A-143D.

Pistons 134A and 134C are inserted into bores 126A and 126C and sealed therein by end caps 123A and 123D and end caps 123C and 123F, respectively. Similarly, bypass piston 132 is inserted into piston bore 126B and enclosed therein by end caps 123B and 123E. End caps 123A-123F are, for example, threaded into mating threads lining counterbores 140A-140C and 140I-140K and sealed with O-rings. Once inside bores 126A and 126C, pistons 134A and 134C form end chambers 144A-144D between the ends of the pistons and the end caps. Additionally, pistons 134A and 134C include undercuts 146A-146D that form internal chambers 148A-48D.

Pistons 134A and 134C and bypass piston 132 are subject to high pressure inlet fluid from porting 136, which connects internal chambers 148A-148D to each other and to internal chambers of other pistons not shown. Pistons 134A and 134C are subject to high pressure in end chambers 144A, 144C, 144D and 144F that causes reciprocating motion consistent with the description above. Bypass piston 132 is, however, substantially equal in length to the length of piston chamber 126B such that reciprocating motion is inhibited. Specifically end surfaces of bypass piston 132 engage end caps 123B and 123E. Bypass piston 132 does not include undercuts that produce internal chambers. Bypass piston 132 includes central portion 150 that is substantially the same diameter as piston bore 126B to form a seal having very small gap. Central portion 150 also includes grooves for receiving O-rings 152A and 152B that close the gap. Central portion 150 divides piston bore 126B into first and second fluid passages. Bypass piston 132 also includes necked-down end portions, or flow portions, 154A and 154B that extend inside piston bore 126B from undercuts 142B and 142E to end chambers 144B and 144E, respectively. As such, bypass piston 132 is a dummy piston that permits fluid from passages 138A-138D to simply pass through piston bore 126B in route between piston bores 126A and 126C without distributing a burst of fluid to an outlet. Outlets 116 machined into valve block 112 for piston bore 126B are plugged with a sealed fitting. Bypass piston 132 thus provides one means for reducing the number of active piston stations and active outlets within block 112 without the need of changing the geometry of valve block 112 and the porting machined therein. Thus, for example, valve block 112 of FIG. 5 can be reduced from eight active pistons to seven active pistons. Configured as such, the valve block is converted back to eight active pistons by removing the dummy piston and any sealed fittings.

The reciprocating of pistons 134A and 134C requires close tolerances between the outer diameter of each piston and its associated piston bore. Machining of bores 126A-126H is thus an important step in manufacturing of valve 102 due to the close tolerances that must be achieved between the pistons and the bores. For example, the pistons form a metal-to-metal seal inside bores 126A-126H to prevent fluid from leaking between internal chambers and end chambers formed by the piston. As such, each of bores 126A-126H is first roughly located using a drill. Next other features of each of piston stations 114A-114H are machined into bores 126A-126H. For example, counterbores 140A-140H can be formed using a counterbore cutter and undercuts 142A-142F can be formed using a Woodruff cutter. The last step in producing piston bores 126A-126C comprises honing of the bores, which produces a smooth bore with very tight tolerances.

As shown in FIG. 5, piston stations 114A-114H are arranged along circle 128, which is centered around center point 130 to facilitate manufacture of valve block 112. Circle 128 comprises a geometric path that extends in a plane parallel to piston face 122A and intersects each of bores 126A-126H. In one embodiment, circle 128 includes a circumference that intersects the center of each of bores 126A-126H. Center point 130 is equidistant from each of the centers of bores 126A-126H and bores 126A-126H are distributed equally around the circumference of circle 128. As described, piston bores 126A-126H are arranged in a circular array. This results in piston bores 126A-126H also having a polygonal outline. As shown in FIG. 5, piston bores 126A-126H are arranged in an octagonal outline. As shown in FIG. 4, piston bores 126A-126F are arranged in a hexagonal outline. As shown in FIG. 3, piston bores 126A-126D are arranged in a square outline.

Center point 130 comprises an indentation or notch into which a machining support can be inserted to reference machining points for bores 126A-126H. Specifically, valve block 112 is positioned within a cradle that secures the block and rotates with respect to a cutting tool. Center point 130 provides an index point for the cutting tool with a fixed distance from each piston station. As such, the first rough-cut piston bore can be honed with the cutting tool by descending and retreating the cutting tool into the piston bore. The cradle then rotates valve block 112 a fixed amount equal to the desired spacing between piston bores along circle 128. The location of the next piston bore to the cutting tool once the cradle rotates is the same as for the previous piston bore. Thus, the cutting tool need only descend into block 112 and retreat without further indexing. The process is repeated for each rough-cut piston bore. By locating the piston bores around a circle, the honing process can be precisely executed with minimal repositioning of block 112 and the machining equipment. Furthermore, center point 130 is located at the center of gravity of block 112 such that block 112 is balanced, reducing the time needed for the cradle to position block 112.

After piston bores 126A-126C are completed, or before the honing step is completed, porting 136 and porting 138A-138D is machined into block 112. Machining of porting 136, for example, requires precise placement such that piston bores 126A-126C are opened at the desired time and place with respect to movement of pistons 134A and 134C. For example, it is desirable for internal chamber 148A to be opened by undercut 146A of piston 134A at approximately the same time internal chamber 148B is opened by undercut 146B such that fluid volume can be equally displaced throughout valve 102. Ports 138A-138D are small holes relative to the distance the drill bit must travel to produce the bore. That is, the diameter of the bores is small compared to the length of the bores. Typically, under such circumstances the drill bit has a tendency to "walk" as it progresses through the material. This makes predicting the exact location where the drill bit will pierce the piston bore somewhat unpredictable, at least to the accuracy required for precise opening of the piston bores.

With reference to FIG. 6B, the present invention utilizes a two-stage drilling process in conjunction with undercuts 142C and 142F to alleviate problems associated with drill bit walk. Porting 138B and 138D comprise diagonal passageways connecting end chambers 144A and 144D to undercuts 142C and 142F, respectively. Porting 138B and 138D are formed by performing machining operations inside piston bore 126C. First, porting 138B and 138D are partially drilled using a drill bit having a first diameter to form a first length of the porting extending over back bores 156B and 156D, respectively. The first diameter is large relative to the length of porting 138A-138D to minimize walking. Back bores 156B and 156D permit a smaller diameter drill bit to be inserted into valve block 112 a closer distance to piston bore 126C such the a smaller diameter drill bit is used to pierce undercuts 142A-142F. The smaller diameter drill bit need only traverse a second length of the porting that is shorter than the overall length to again minimize walking.

Undercuts 142A-142F are precisely positioned using the Woodruff cutter, which can be positioned directly adjacent to piston bore 126C in the location desired. Specifically, undercuts 142A-142F are positioned at the exact point where it is desired for internal chambers 148B and 148C to open. Undercuts 142A-142F comprise a void adjacent to piston bores 126A that increases the local cross-sectional area of the bore. Undercuts 142A-142F extend completely around the circumference of piston bores 126A and 126C. Undercuts 142A-142F thereby produce a larger surface area for drill bits to intersect. Specifically, undercuts 142A-142F result in a pair of horizontal (with respect to FIG. 6B) surfaces that intersect piston bore 126C at right-angles and at precise positions. Undercuts 142A-142F result in a single vertical (with respect to FIG. 6B) surface that produces a large target for the drill bit to intersect. The height of the vertical surface is larger than the diameter of the smaller diameter drill bit used to connect back bores 156B and 145D with undercuts 142C and 142F. The resulting geometry is a cylindrical undercut. The precise location at which the drill bit intersects the vertical surface is not important as the undercuts completely encircle the horizontal surfaces. So long as the drill bit pierces the vertical surface, porting 138B will be fluidly connected with internal passage 148B, with the horizontal surfaces ensuring that the connection occurs at the desired location. Such drilling and machining processes reduces the number of valve blocks 112 that are produced out-of-spec and increases the accuracy of the volumetric output of valve 102.

Undercuts 143 improve the operation of valve 102 in other ways. For example, undercuts 143A and 143B reduce point loading on piston 134A. For example, as shown in FIG. 6B, porting 165A intersects piston bore 126A off to the side of piston 134A. Likewise, porting 165I intersects piston bore 126A off to the side of piston 134A. Ordinarily, without undercuts 143A and 143B, fluid traveling through porting 165A and 165I and into internal chambers 148A and 148D (when undercuts 146A and 146B of piston 134A are so positioned) would impact piston 134A at only a portion of the circumference of undercut 143A or 143B. This disproportion would result in a slight disturbance to the reciprocation of piston 134A within piston bore 126A, increasing wear at piston station 114A. Undercuts 143A and 143B, however, distribute the force of incoming fluid around the entire circumference of piston 134A. As such, linear reciprocating motion of piston 134A is not disturbed in the radial direction with respect to piston bore 126A.

With reference to FIG. 6B, a second means for reducing the number of active piston stations and active outlets within block 112 without the need of changing the geometry of valve block 112 and the porting machined therein. The embodiment of FIG. 6B is machined in the same way as the embodiment of FIG. 6A with the exception that piston bore 126B is not extended through from piston face 122A to piston face 122B. Additionally, undercuts 142B and 142E (FIG. 6A) are omitted. Piston bore 126B is replaced by stub bores 158A and 158B. Stub bore 158A extends into piston face 122A far enough to intersect porting 138A at a first position. Stub bore 158B extends into piston face 122B far enough to intersect porting 138C at a second position. This intersection occurs where undercuts 142B and 142E would be positioned. Except in this scenario, precise intersection of stub bores 158A and 158B with porting 138A and 138C is not needed as fluid need only pass from the porting 138A to porting 138B and from porting 138C to 138D to convey the fluid to internal chambers 148B and 148C where undercuts 142C and 142F are located. Thus, for example, valve block 112 of FIG. 5 can be reduced from eight active pistons to seven active pistons.

Stub bores 158A and 158B can be machined into valve block 112 using a sub-set of the machining instructions used to machine piston bores 126A and 126C. For example, instead of drilling piston bore 126B, stub bore 158A and stub bore 158B are machined. However, additional machining steps are the same, such as those for counterbores 140B and 140J and porting 138A and 138C. Machining for undercuts 142B and 142E is simply omitted. This results in stub bores 158A and 158B having an envelope of removed material that fits within an envelope required for machining of a piston bore. Therefore, if desired stub bores 158A and 158B could be converted into a piston bore by simply re-machining valve block 112 with the instructions for machining a piston bore at the location of stub bores 158A and 158B. Specifically, the portion of material of block 112 forming the divider between stub bores 158A and 158B can be machined away and undercuts 142B and 142E added.

FIG. 7 is a side view of the third embodiment of series progressive divider valve 102 of the present invention showing valve block 112 having eight outlets 116A-116H arranged in a circular array. Each of outlets 116A-116H comprises one of outlet bores 160A-160H. Outlets 116A-116H are arranged along circle 162 and around inlet 118. Outlet bores 160A-160H connect bypass passages 164A-164H with porting 165A-165H, which extend into valve block 112 to connect to an undercut 143 that engages one of undercuts 146A-146F (FIG. 6A) of pistons 134. FIG. 8 is a diagrammatic cross-section through series progressive divider valve 102 of FIG. 7 taken at section 8-8 showing bypass passages 164A-164D connecting valve outlets 160A-160D. FIG. 8 shows cross-port fittings 168A-168D coupled to outlets 116A-116D. In FIG. 7, cross-port fittings are omitted such that outlet bores 160A-160H are visible. FIGS. 7 and 8 are discussed concurrently.

As shown in FIG. 7, outlet bores 160A-160H are arranged along circle 162, which is centered around inlet 118. Circle 162 comprises a geometric path that extends in a plane parallel to outlet face 124A and intersects each of outlet bores 160A-160H. In one embodiment, circle 162 includes a circumference that intersects the center of each of bores 160A-160H. Inlet 118 is equidistant from each of bores 160A-160H and bores 160A-160H are distributed equally around the circumference of circle 162. As described, bores 160A-160H are arranged in a circular array. This results in bores 160A-160H also having a polygonal outline. As shown in FIG. 7, bores 160A-160H are arranged in an octagonal outline. Outlet bores 160A-160H need not, however, be arranged in a true circular array. For example, bores 160A-160H could be arranged around an oval array or a polygonal array. Two outlet bores, however, must be aligned with each piston bore. Specifically, outlet bores 160A-160H are arranged in a proximal configuration such that each outlet can be connected to an open loop fluid path that connects all of the outlets on each of outlet faces 124A and 124B.

With outlet bores 160A-160H arranged in a circular array, they are close enough to each other to allow adjacent porting of porting 165A-165H to connect to each other. Such an arrangement of circular porting is permitted due to the fact that outlets 116A-116H are provided on a pair of surfaces, outlet faces 124A and 124B, that are perpendicular to a pair of surfaces, valve faces 122A and 122B, in which piston stations 114A-114H are provided. Such a circular arrangement permits valve block 112 to be fashioned in a more compact manner. Such an arrangement also avoids the need for using an "inlet" block and an "end" block, as described above with reference to the prior art, and allows the outlets to be connected as described here. As such, valve 102 does not include any "last stop" outlets that cannot be plugged with a cross-port fitting.

Outlet bores 160A-160H extend into outlet face 124A only so far as to connect to porting 165A-165H. Each of bypass passages 164A-164H connects one of outlet bores 160A-

160H to an adjacent one of porting 165A-165H. Bypass passages 164A-164H do not necessarily extend through the centers of bores 160A-160H such that they do not form a true circle. Bypass passages 164A-164H, however, to give rise to the polygonal outline mentioned above. Bypass passages 164A-164H are angled such that a drill bit can be inserted into outlet bores 160A-160H to intersect porting 165A-165H. Bypass passages 164A-164H, with porting 165A-165H, form an open loop flow path into which fluid from any of the outlets can be routed. As shown in FIG. 8, outlet bores 160A-160D are coupled to cross-port fittings that can be configured to only permit fluid into couplings 168A-168D, as fittings 125A, 125B and 125D are configured, or to permit fluid into coupling 168A-168D to flow into bypass passages 164A-164D with the aid of a plug, as fitting 125C is configured with plug 169 using threaded engagements 170.

Figure 9:
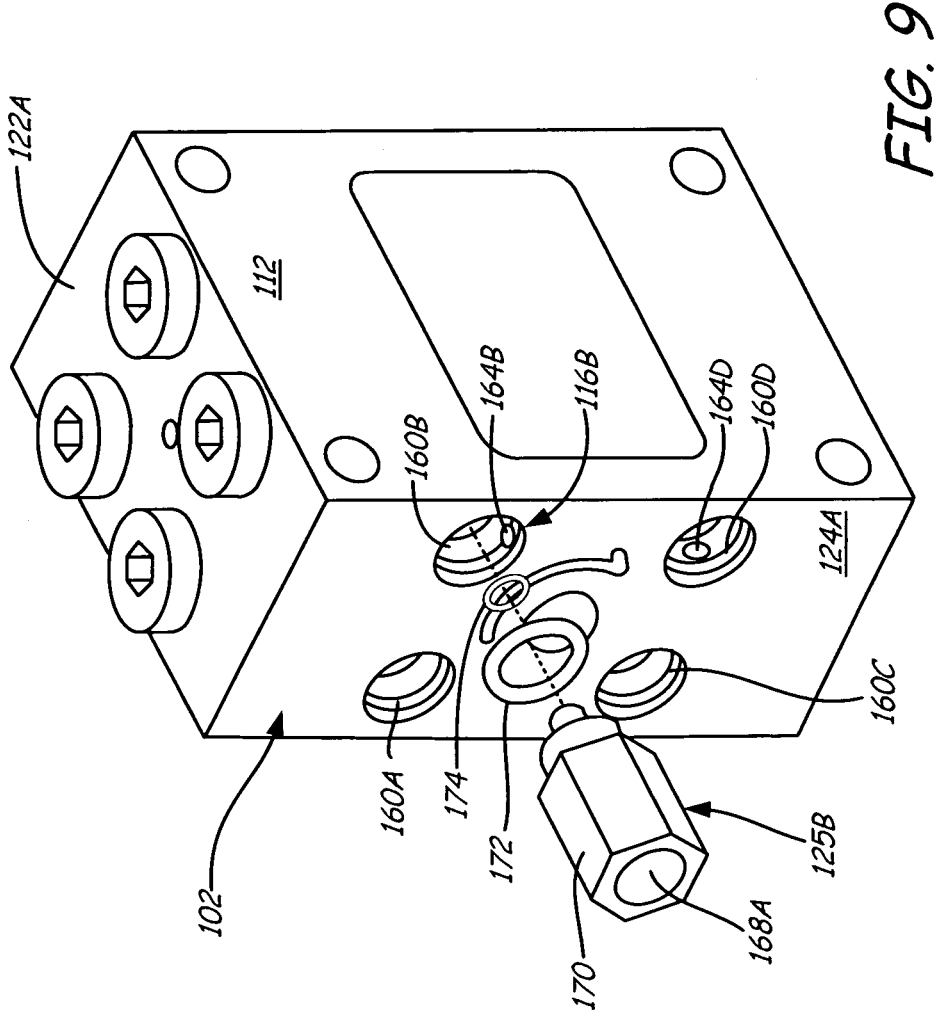
FIG. 9 is a partially exploded perspective view of the series progressive divider valve of FIG. 3 showing a double-sealed cross-port fitting removed from an outlet.

FIG. 9 is a partially exploded perspective view of series progressive divider valve 102 of FIG. 3 showing double-sealed cross-port fitting 125B removed from outlet 116B. Cross-port fitting 125B includes adapter 171, first seal 172 and second seal 174. As discussed with reference to FIG. 7, outlets 116A-116D include bypass passages 164A-164D that permit fluid to flow from one outlet to the next. However, it is not desirable to always have outlets 116A-116D connected to each other. Seals 172 and 174 of cross-port fitting 125B can be configured to permit fluid to flow from outlet bore 160B through to coupling 168A (FIGS. 10A and 11A), or to flow from outlet bore 160B through to bypass passage 164B with the use of plug 170 (FIGS. 10B and 11B).

FIG. 10A is cross-sectional view of a first embodiment of double-sealed cross-port fitting 125B in a pass-through configuration. Cross-port fitting 125B includes adapter 171, first seal 172 and second seal 174. Adapter 171 includes coupling segment 176A-176B, which includes first diameter portion 176A and second diameter portion 176B. Adapter 171 forms coupling 168B (FIGS. 8 & 9) to which an outlet hose can be coupled or into which plug 170 (FIG. 9) can be fitted. First diameter portion 176A comprises a ring segment extending radially outward from axially extending portion 176A-176B. First diameter portion 176A includes threads 178 that engage mating threads in outlet bore 160B. First diameter portion 176A forms groove 179 in coupling segment 176A-176B. Second diameter portion 176B comprises an axial extension from first diameter portion 176A having a smaller diameter. Second diameter portion 176B includes groove 180 into which second seal 174 is positioned. First seal 172 is positioned in groove 179 adjacent chamfer 182 in outlet bore 160B. Internal passage 184 extends through coupling segment 176A-176B and into adapter 171 to intersect coupling 168A. Coupling segment 176A-176B thus forms a sidewall surrounding passage 184.

Coupling segment 176A-176B is inserted into outlet bore 160B such that adapter 171 engages the exterior of valve block 112. Threaded engagements 178 of first diameter portion 176A engage mating threads in outlet bore 160B. Additionally, internal passage 184 meets up with porting 165B and bypass passage meets up with first diameter portion 176A. Inserted as such, the bottom of groove 179 and the bottom of groove 180 face radially away from passage 184 and toward outlet bore 160B.

In the embodiment shown, first seal 172 comprises a rubber O-ring fitted around the bottom surface of groove 179. When fitting 125B is assembled with outlet bore 160B, seal 172 is compressed between groove 179 and chamfer 182 to prevent leakage of fluid from valve body 112. Specifically, fluid present in bypass passage 164B, such as from the outlet at the end of bypass passage 164B knot shown, is prevented from migrating out of valve body 112. Likewise, second seal 174 comprises a rubber O-ring fitted around the bottom surface of groove 180. In other embodiments, seals 172 and 174 may comprise other types of O-rings or other types of seals, as discussed with reference to FIGS. 11A and 11B. When fitting 125B is assembled with outlet bore 160B, seal 174 is compressed between groove 180 and outlet bore 160B to prevent leakage of fluid from valve body 112. Specifically, fluid from porting 165B is prevented from passing between coupling segment 176A-176B and valve block 112 to reach bypass passage 164B. Seal 174 blocks the fluid from engaging threaded engagements 178. As such, all fluid from porting 165 is routed directly into passage 184 and out fitting 125A. Thus, a hose connected to coupling 168A, which includes threaded engagements 170 (FIG. 8), will receive fluid distributed by valve 102. Seal 174 can be removed and coupling 168A capped with plug 170 to redirect fluid from porting 165B into bypass passage 164B.

FIG. 10B is a cross-sectional view of double-sealed cross-port fitting 125B of FIG. 10A in a bypass configuration. In FIG. 10B, seal 174 is removed from groove 180, but seal 172 remains in groove 179. Plug 170 is threaded into coupling 168A to block fluid flow through adapter 171. As such, porting 165B is fluidly coupled with bypass passage 164B. Second diameter portion 176B has a diameter slightly smaller than the portion of outlet 160B immediately surrounding portion 176B such that fluid may pass between. Second diameter portion 176B also has a diameter smaller than that of first diameter portion 176A such that fluid flow is impeded from traveling towards first seal 172. First diameter portion 176A also includes angled shoulder 186 to deflected fluid back toward bypass passage 164B. Fluid is, however, prevented from continuing to flow between outlet 160B and adapter 171 by the presence of seal 172. As such, fluid flows from porting 165B to bypass passage 164B to link up with a different outlet and leave valve block 112.

FIG. 11A is cross-sectional view of a second embodiment of double-sealed cross-port fitting 125B in a pass-through configuration. FIG. 11B is a cross-sectional view of double-sealed cross-port fitting 125B of FIG. 11A in a bypass configuration. In the embodiment of FIGS. 11A and 11B, fitting 125B includes all of the same features as the embodiment of FIGS. 10A and 10B save groove 180. Additionally, in FIGS. 11A and 11B, seal 174 is switched to face seal 188. Face seal 188 circumscribes portion 176B and engages axial surface 190 of first portion 176A. When fitting 125B is threaded into bore 160B, face seal 188 is compressed between axial surface 190 and a corresponding axial surface of bore 160B. In the embodiment shown, face seal 188 comprises a polymeric face seal having generally flat axial facing surfaces. Specifically face seal 188 is comprises of an inner metallic ring around which a polymeric washer is fitted, as is known in the art.

Although the present invention has been described with reference to preferred embodiments, workers skilled in the art will recognize that changes may be made in form and detail without departing from the spirit and scope of the invention.

The invention claimed is:
1. A series progressive divider valve comprising:
   a valve body comprising:
      a fluid inlet extending into an exterior of the valve body;
      a plurality of piston bores extending through the valve body from a first end to a second end, wherein the piston bores are arranged along a first circular path intersecting each of the piston bores, each piston bore including a piston;

a plurality of outlet bores extending into the valve body, the plurality of outlet bores comprising:
a first set of outlet bores; and
a second set of outlet bores;
porting forming a plurality of passageways connecting the piston bores to each other and with the plurality of outlet bores such that when high pressure fluid is applied to the inlet each of the pistons reciprocates from the first end to the second end in sequence;
wherein the valve body comprises a parallelepiped block formed from a single piece of material and having a plurality of faces;
wherein each of the plurality of piston bores extends between a first pair of opposing faces and the first circular path extends in a plane parallel to the first pair of faces;
wherein the first and second sets of outlet bores are distributed equally between a second pair of opposing faces; and
wherein the outlet bores are arranged along a second circular path extending in a plane parallel to the second pair of opposing faces, the second circular path intersecting each of the outlet bores.

2. The series progressive divider valve of claim 1 wherein the second pair of faces are perpendicular to the first pair of faces.

3. The series progressive divider valve of claim 1 wherein a circumference of the second circular path intersects centers of the outlet bores and the outlet bores are equally spaced around the circumference of the second circular path.

4. The series progressive divider valve of claim 1 wherein the first circular path intersects a center of each of the plurality of piston bores.

5. The series progressive divider valve of claim 4 wherein centers of the piston bores are equally spaced around a circumference of the first circular path.

6. The series progressive divider valve of claim 1 wherein a center of the first circular path extends through a center of gravity of the valve body.

7. The series progressive divider valve of claim 1 and further comprising:
a center notch disposed at a center of the first circular path, the notch being equidistant from each piston bore.

8. The series progressive divider valve of claim 1 wherein each piston comprises:
a first end surface to define part of a first end chamber within the piston bore through which it extends;
a second end surface to define part of a second end chamber within the piston bore through which it extends;
a first undercut to define part of a first internal chamber within the piston bore through which it extends; and
a second undercut to define part of a second internal chamber within the piston bore through which it extends.

9. The series progressive divider valve of claim 8 wherein the porting forming a plurality passageways comprises for each piston:
first and second passageways connecting each of the internal chambers to a separate outlet; and
third and fourth passageways connecting each of the internal chambers to an end chamber.

10. The series progressive divider valve of claim 9 and further comprising:
a plurality of undercuts located at an intersection of the third and fourth passages with the internal chambers.

11. A series progressive divider valve comprising:
a valve body comprising:
a fluid inlet extending into an exterior of the valve body;
a plurality of piston bores extending through the valve body, wherein the piston bores are arranged along a first circular path intersecting each of the piston bores, each piston bore including a piston;
a plurality of outlet bores extending into the valve body, the plurality of outlet bores comprising:
a first set of outlet bores; and
a second set of outlet bores;
porting forming a plurality of passageways connecting the piston bores to each other and with the plurality of outlet bores such that when high pressure fluid is applied to the inlet each of the pistons reciprocates in the piston bore in sequence;
wherein the valve body comprises a parallelepiped block having a plurality of faces;
wherein each of the plurality of piston bores extends between a first pair of opposing faces and the first circular path extends in a plane parallel to the first pair of faces; and
wherein the first and second sets of outlet bores are distributed between a second pair of opposing faces; and
wherein the outlet bores are arranged along a second circular path extending in a plane parallel to the second pair of opposing faces, the second circular path intersecting each of the outlet bores.

12. The series progressive divider valve of claim 11 wherein the second pair of faces are perpendicular to the first pair of faces.

13. The series progressive divider valve of claim 11 wherein the first circular path intersects a center of each of the plurality of piston bores, and wherein a circumference of the second circular path intersects centers of the outlet bores and the outlet bores are equally spaced around the circumference of the second circular path.

14. The series progressive divider valve of claim 13 wherein centers of the piston bores are equally spaced around a circumference of the first circular path.

15. The series progressive divider valve of claim 11 wherein a center of the first circular path extends through a center of gravity of the valve body.

16. The series progressive divider valve of claim 11 wherein each piston comprises:
a first end surface to define part of a first end chamber within the piston bore through which it extends;
a second end surface to define part of a second end chamber within the piston bore through which it extends;
a first undercut to define part of a first internal chamber within the piston bore through which it extends; and
a second undercut to define part of a second internal chamber within the piston bore through which it extends.

17. The series progressive divider valve of claim 16 wherein the porting forming a plurality passageways comprises for each piston:
first and second passageways connecting each of the internal chambers to a separate outlet; and
third and fourth passageways connecting each of the internal chambers to an end chamber.

18. The series progressive divider valve of claim 17 and further comprising:
a plurality of undercuts located at an intersection of the third and fourth passages with the internal chambers.

* * * * *

UNITED STATES PATENT AND TRADEMARK OFFICE
CERTIFICATE OF CORRECTION

PATENT NO. : 8,939,176 B2  Page 1 of 1
APPLICATION NO. : 13/700288
DATED : January 27, 2015
INVENTOR(S) : Andrew J. Klaphake et al.

It is certified that error appears in the above-identified patent and that said Letters Patent is hereby corrected as shown below:

In the Specification

Col. 11, Line 67
  Delete "knot shown"
  Insert --(not shown)--

Signed and Sealed this
Twenty-ninth Day of September, 2015

Michelle K. Lee
*Director of the United States Patent and Trademark Office*